United States Patent [19]

Walsh, III

[11] 4,323,328

[45] Apr. 6, 1982

[54] VEHICLE HOISTING TOW TRAILER

[76] Inventor: Michael D. Walsh, III, 5868 Dogwood St., San Bernardino, Calif. 92404

[21] Appl. No.: 11,871

[22] Filed: Feb. 13, 1979

[51] Int. Cl.³ ............................................. B60P 3/12
[52] U.S. Cl. ................................... 414/563; 280/402
[58] Field of Search ........................ 414/563; 280/402

[56] References Cited

U.S. PATENT DOCUMENTS

| 3,458,068 | 7/1969 | Scott | 414/563 |
| 3,559,827 | 2/1971 | Schier | 414/563 |
| 3,627,154 | 12/1971 | Troup | 414/563 |

Primary Examiner—Robert G. Sheridan
Attorney, Agent, or Firm—Dana E. Keech

[57] ABSTRACT

The subject trailer includes a single tubular for-and-aft horizontal tow-bar towed at its front end by a tow ball hitch. Welded vertically to a rear end portion of the tublar tow bar is a tubular mast having pulleys guiding a cable from a winch on said tow bar up and over said mast and connecting to a towing hammock for attaching to a vehicle to be towed. The hammock has a central pair of flanges guiding the hammock vertically on the tubular mast while allowing the mast to rotate 30° on its own axis between the flanges while bolted to the hammock after the latter being hoisted to the vehicle towing level. Welded to the tow bar is a rigidly symmetrically laterally extending tubular axle co-axially rotatably mounting a pair of #15 sized balloon tired wheels on the opposite axle ends, causing the trailer to track straight behind the towing vehicle by flexing, both at the vertical tow-ball socket joint and at the vertical 30° mast-hammock-flange-and-bolt-joint.

4 Claims, 7 Drawing Figures

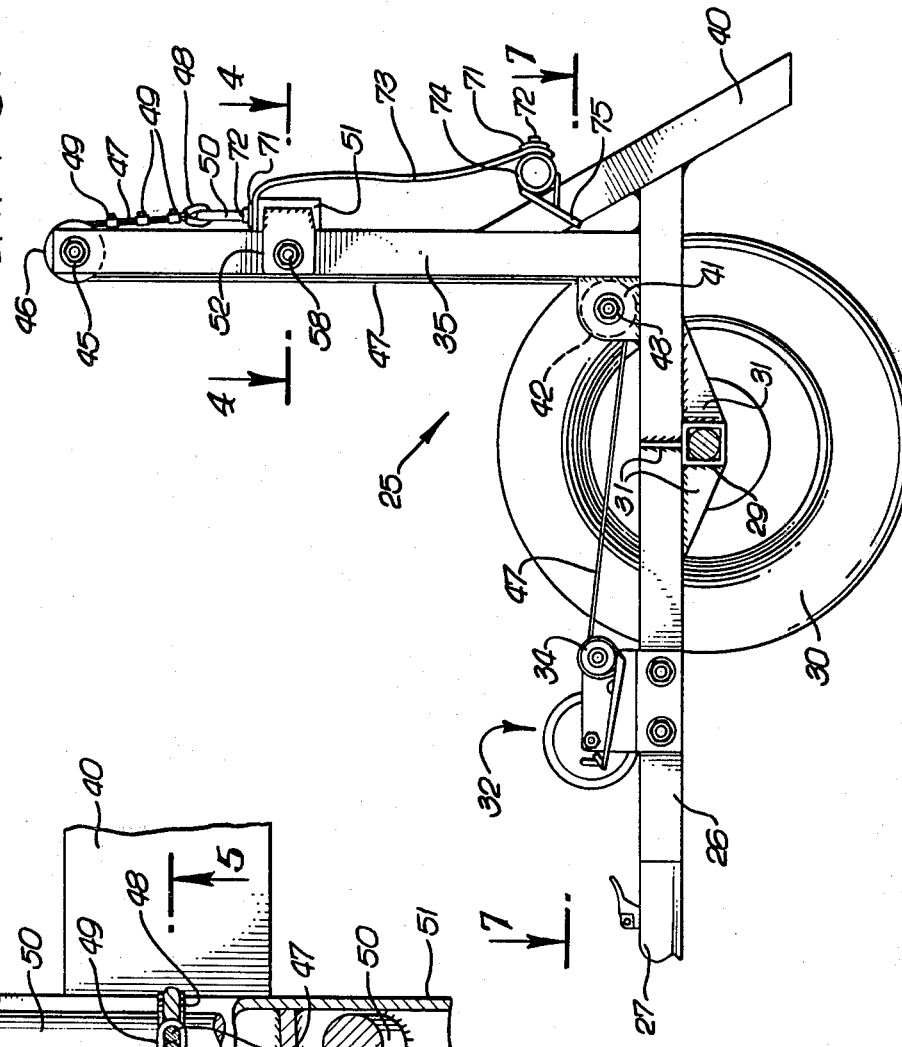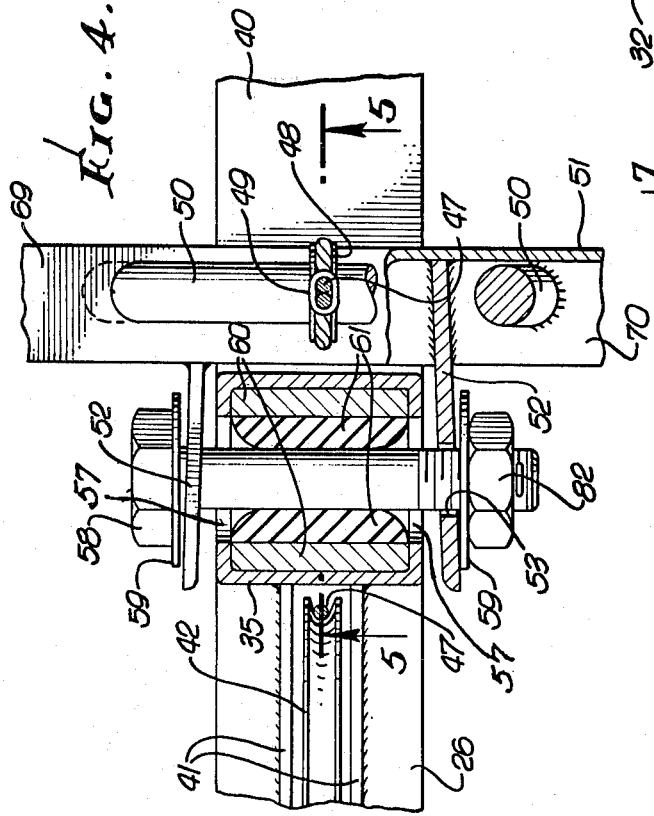

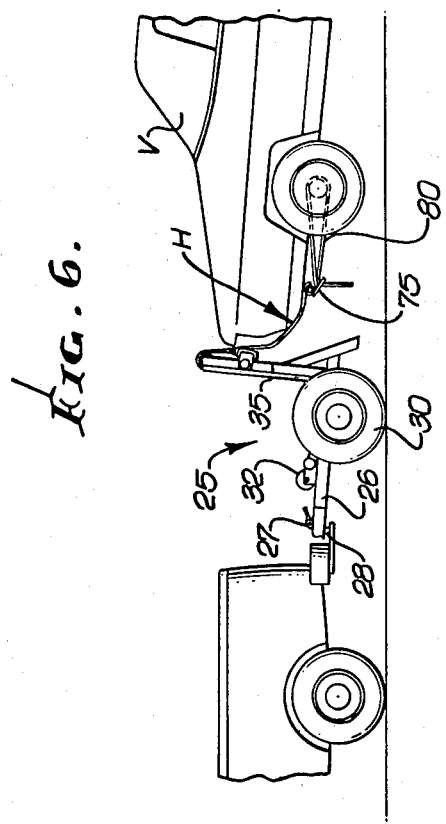
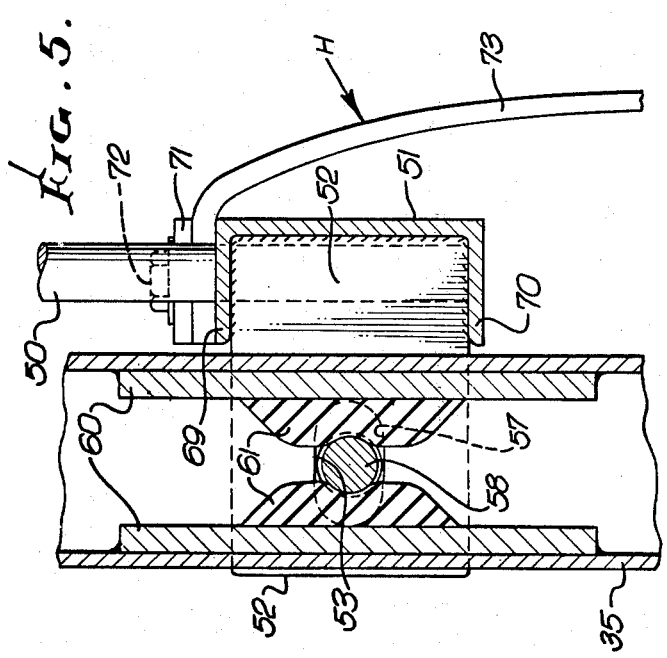
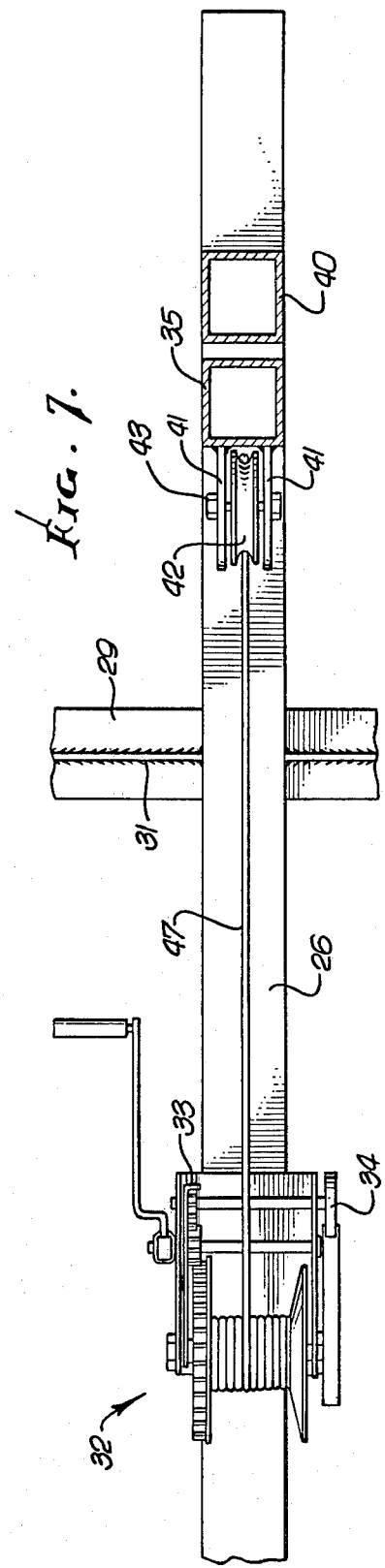

VEHICLE HOISTING TOW TRAILER

SUMMARY OF THE INVENTION

A four foot tow bar is pivotally connected through a standard socket trailer hitch to a ball headed post found on the rear bumper of any four wheeled automotive highway tow vehicle. One foot from its rear end, said bar rests upon and is integrally united by welding with a four foot transverse axle pivotally mounting a pair of number 15 balloon tired automobile wheels at its opposite ends.

A hand crank powered cable winch is fixed on a forward portion of the tow bar and a three foot six inch tall mast is rigidly welded to the rear end of the tow bar and supports a four inch cable pulley in a cleft in its upper end. Said bar, mast and axle are preferably formed of three inch square steel tubing. A second four inch cable pulley is fixed on said bar in the crotch between said bar and said mast and a quarter inch steel cable is wound up on the winch and extends therefrom around the lower of said pulleys and then around the upper pulley and downwardly to terminate in an eye encircling a loop of seven-eighths inch rod welded at its opposite lower ends to the middle portion of a horizontal four inch channel iron about three feet long and having centrally welded thereto a pair of co-axially apertured flanges which guide vertical movement of said channel iron on said mast as said channel iron is raised or lowered by the operation of said winch. When said channel iron is in its upwardmost position, said apertured flanges are at the same level as a pair of transverse slots formed in the mast and the channel iron is secured at said level on said mast by a seven-eighths inch diameter steel bolt which extends loosely through said aligned apertures and slots. A round three inch pipe three feet long is suspended sixteen inches below said channel iron by two ten inch wide pieces of rubber belting, the upper ends of which are clamped on the top edge of said channel iron and the lower edges of which are clamped to the rear face of said round pipe. Key hole apertured chain locking plates are welded to and extend laterally beyong opposite ends of said pipe. The elongation of said mast slots is to permit said channel iron to swing in a horizontal plane relative to said mast through a net angle of 30° as is required in steering the invention when towing a vehicle.

Welded to lower rear portions of said tow bar and mast and lying in the same vertical plane therewith is rearwardly and downwardly inclined guide member which keeps the channel iron centered when said bolt is removed and said channel iron lowered and then lifted as is required when applying the invention to a vehicle to be towed.

To accomplish this, a pair of chains with hooks at their rear ends are looped around parts of the main frame of said vehicle, preferably near the front wheels thereof, after which the front ends of said chains are inserted through the chain link locking plates on the opposite ends of the round pipe so as to hold the latter disposed inwardly under the front end of the vehicle to be towed as the winch is manually actuated to wind in the cable on the winch and lift the channel iron and the rubber belting suspended round pipe so as to raise the front wheels off the ground as the apertured flanges at the middle of the channel iron are elevated into alignment with the pair of slots provided in said mast, at which point the channel iron is secured in its topmost elevated position by the insertion of said belt through said mast slots and said flange apertures.

The winch being locked, the vehicle thus captured may be towed to its destination and there deposited by unbolting the channel iron flanges and unwinding the cable winch. The chains, being removed from the vehicle thus delivered are applied to the pipe to tighten the gear against rattling when travelling empty.

BRIEF DESCRIPTION OF THE DRAWINGS

FIG. 3 is a left side elevational view of the invention with the tow target vehicle capturing hammock bolted in its travelling suspended position on the tow trailer mast, and with the left side wheel removed to better illustrate the body structure located between the wheels.

FIG. 4 is a fragmentary enlarged horizontal sectional detail view taken on the line 4—4 of FIG. 3.

FIG. 5 is a fragmentary detailed vertical sectional detail view taken on line 5—5 of FIG. 4.

FIG. 6 is a reduced scale left side elevational view of the invention with the rear end of a tow target vehicle enveloped by the tow trailer hammock and locked in elevated position on the trailer mast in readiness for towing.

FIG. 7 is an enlarged horizontal fragmentary sectional scale view taken on the line 7—7 in FIG. 3 to illustrate structural details of the winch means and central tow bar of the invention.

DETAILED DESCRIPTION OF THE PREFERRED EMBODIMENT

Figure 1:
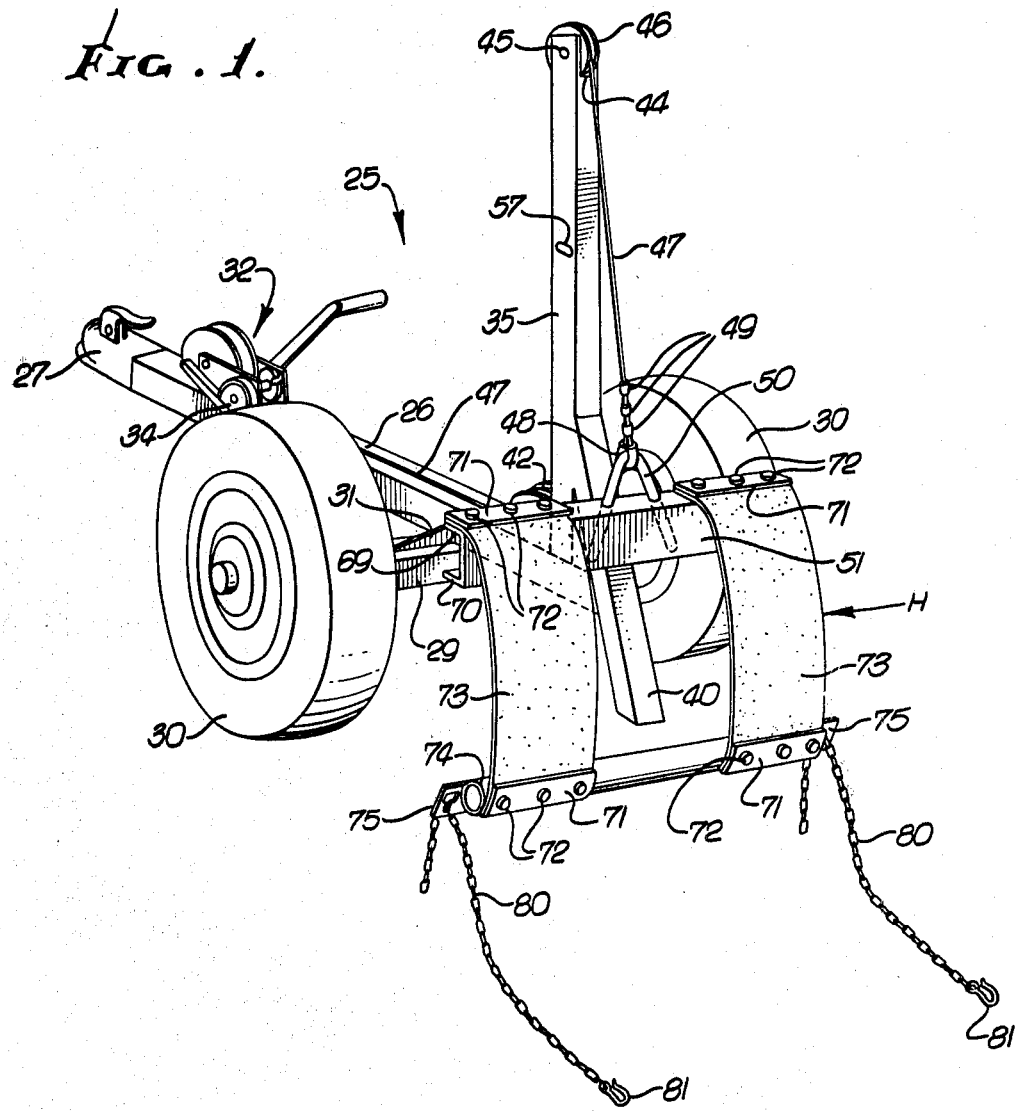
FIG. 1 is a diagrammatic left-rear three-quarter perspective view of a preferred embodiment of the invention with the towing hammock lowered and hook chains depending therefrom in readiness to be extended under and attached to the frame of a tow target vehicle.

Referring specifically to the drawings and particularly to FIG. 1, the preferred embodiment of the invention comprises a road vehicle hoisting tow trailer 25 which includes a four foot tow bar 26 preferably formed of three inch square tubing and integrally welded at its front end to a standard socket trailer hitch 27 which is capable of readily latching onto a ball headed post 28 which is standard equipment for the rear bumpers of four wheeled automotive highway vehicles in general when used for privately towing trailers.

About one foot from its rear end, said bar 26 rests upon and is integrally united by welding to a four foot transverse axle 29 which is also formed of three inch square hollow tubing. Suitable bearings are provided on the outer end portions of axle 29 and provide anti-friction concentric mounts for a pair of #15 balloon tired automobile wheels 30 which support said car hoisting tow trailer 25 and half the weight of any car being towed. The ruggedness of the joint formed by welding together the tow bar 26 and transverse axle 29 is enhanced by the use of gusset plates 31 which are welded solidly in place in the various right angles formed between said tow bar and axle.

A hand crank powered cable winch 32 is fixed on a foward portion of the tow bar 26 and includes a latch 33 for locking said winch and a brake 34 for slowing down the winch when paying out cable therefrom.

Resting on and welded to and extending vertically from a rear end portion of tow bar 26 is a forty-two inch mast 35 and this mast is also formed of three inch square hollow steel tubing. Extending obliquely downwardly from the back face of said mast and also made of three inch square hollow steel tubing and solidly welded to said mast and to the rear end of tow bar 26 is an oblique guide element 40 which terminates at its lower end several inches above the ground and forms a 30° angle with the vertical mast 35. Welded in place in the forward crotch formed between tow bar 26 and mast 35 is a pair of vertical parallel plates 41 between which a four inch pulley 42 is pivotally supported on a bolt 43. In a similar manner a vertical kerf 44 is formed in the upper four inches of mast 35 and a bolt 45 is extended transversely through the mast so as to mount thereon within said kerf a second four inch pulley 46.

A supply of quarter inch steel cable 47 is wound up on the winch 32 and extends therefrom underneath pulley 42 and upwardly from back of said pulley around the upper pulley 46 and downwardly therefrom to terminate in a cable eye 48 which is surrounded by the end portion of the cable and the cable end portions thus produced are clamped rigidly together by three bolted clamps 49.

The cable shielding eye 48 encircles a loop 50 formed by bending a seven-eighths inch rod, said loop then being integrally welded in place in a central portion of a hammock hoisting channel iron 51. The opposite ends of loop 50 are spread apart a sufficient distance before their being welded to the hoisting channel iron 51 to allow room for a pair of guide flanges 52 having central co-axial inch diameter holes 53, which flanges are disposed on opposite sides of the mast 35 to be loosely slideably guided vertically by said mast and to allow the rear ends of said guide flanges to extend between end portions of loop 50 and be welded in place to said loop and to said hoisting channel 51. As shown in FIGS. 4 and 5, the mast 35 has inch-wide horizontal slots 57 formed laterally in said mast at a common level therein and about one and three-fourths inches long, the holes 53 and slots 57 receiving a seven-eighths inch bolt 58 having washers 59 for the purpose of supporting the hammock hoisting channel iron 51 at its uppermost operative position on the mast 35. The slots 57 however, and the freedom of movement allowed by the spacing between said mast and said guide flanges 52 permit rotation of the hammock hoisting channel iron 51 about the mast 35 with a total range of 30° from one extreme to the other, this being to facilitate the steering of the vehicle hoisting tow trailer 25 of the invention when it is towing a vehicle.

To compensate for the removal of metal from the mast 35 in forming slots 57, five-eighths inch thick steel bars 60 overlapping this area in the mast are welded inside the mast in opposed relation as shown in FIGS. 4 and 5. Rubber cushions 61 are cemented in place in the mast on opposite sides of bolt 58 to prevent chatter of the device when travelling.

As can be readily seen from the drawings, the upper and lower flanges 69 and 70 of the hammock hoisting channel iron 51 are turned forwardly and flat plate clamps 71 are secured by bolts 72 to the outer ten inch portions of upper flange 69 to secure thereto the upper edges of two ten inch wide sections of half-inch thick rubber belting 73. Co-extensive horizontally with channel iron 51 and suspended from said channel iron by being secured by similar clamps and bolts to lower end portions of belting sections 73 is a three-inch O.D. round pipe 74.

Figure 2:
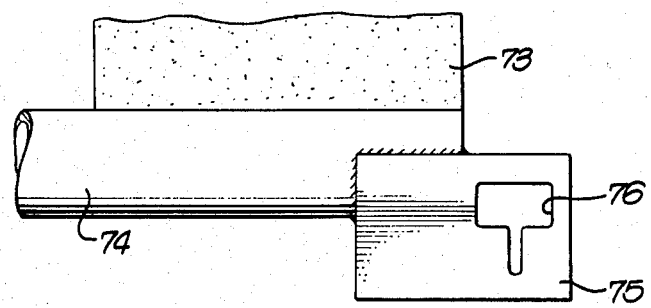
FIG. 2 is an enlarged front elevational fragmentary detail view of one of the two chain link locking plates of the invention.

Chain locking plates 75 are welded to said pipe to extend laterally beyond opposite ends of said pipe, each plate having a T-shaped chain locking hole 76 formed therein as shown in FIG. 2.

A vital accessory employed in the operation of the invention is a pair of welded link tow chains 80 each chain having a hook 81 secured to one end thereof and being of suitable length and strength for performing their functions which will now be described.

OPERATION

When the vehicle hoisting tow trailer 25 is being readied for travelling empty on the highway or is being placed in storage, the winch 32 is operated to raise the hammock hoisting channel iron 51 to its topmost position after which the bolt 58 is inserted in place, as shown in FIG. 3, and the chains 80 are caught at the respective ends of the pipe 74 in the locking holes 76, and the hooks 81 at the opposite ends of the chains are employed to tighten the gear against rattling.

FIG. 6 shows the invention being operated manually by one man after applying it to an automotive vehicle and readying the invention to tow said vehicle. This is done by inserting the hooks 81 at the inner ends of the chains 80 around portions of the main frame of the vehicle to be towed and then applying the hooks to the chains and locking the free ends of chains 80 to locking plates 75, as shown in FIG. 1.

The winch is now hand operated to windup the cable 47 which tightens the rubber hammock H and finally raises the captured end of the target vehicle V until holes 53 and slots 57 are aligned allowing the bolt 58 to be inserted and its nut 82 tightened thereon as shown in FIG. 4.

The winch 32 may also now be locked by setting the latch 33 thereby preventing the unwinding of the winch 32 during the towing of the target vehicle V as shown in FIG. 6. As heretofore noted, turning movements are provided for by the invention to facilitate flexible travel in towing target vehicle V on trailer 25 by permitting a substantial degree of simultaneous articulation about a vertical axis between tubular mast 35 and hammock H and about the vertical pivotal axis formed by the ball headed post 28 and the ball socket trailer hitch 27 on the front end of tow bar 26. Co-ordinating this dual vertical pivotal articulation is the automatic, built-in, geared-to-the-road, fore-and-aft tracking of two rigidly co-axially, axle tip mounted #15 regular automobile balloon tired wheels 30, forward travel of which constantly centralize the tow bar 26, independently of the towed vehicle's tendency to join the path of travel of the trailer.

The claims are:

1. In a road vehicle hoisting tow trailer, the combination of:
   a central longitudinal axial tow bar having a ball-socket trailer hitch at it's forward end;
   twin balloon tired wheel carriage means including a common axle extending equidistantly transversely of and rigidly secured symmetrically to said tow bar at right angles therewith;
   a vertical mast rigidly secured to said tow bar near it's rear end;
   winch means mounted on said trailer, said winch means including a winch, two co-planar pulleys pivotally mounted in the lengthwise medial axial plane of said tow bar and located at the foot and head of said mast, said winch means also including a cable wound up on and paid out from said winch and being guided by said pulleys to and over said masthead and downwardly therefrom behind said mast;

a transversely symmetrically disposed flexible, rectangular vehicle embracing and hoisting hammock;

means for centrally connecting the rear end of said cable to the front upper end of said hammock;

chain and hook means for temporarily connecting rear lower corners of said hammock to the under structure at one end of a vehicle to be towed;

guide means fixed on and extending forwardly from a middle portion of the front upper end of said hammock and straddling said mast to center the upward movement of said hammock on said mast; and means for securing said guide means to said mast when said vehicle has been hoisted to the proper level for towing the same, said securing means allowing a substantial degree of rotation of said guide means about said mast to facilitate steering said trailer in towing said vehicle, while retaining a firm tracking grip between the always parallel, widely, co-axially spaced trailer wheels and the ground.

2. In combination:

a tow bar having a tow-ball-gripping clutch at it's forward end; twin balloon tired wheel carriage means extending transversely of and rigidly secured symmetrically to said tow bar;

a mast rigidly secured to said tow bar near it's rear end;

co-planar pulleys pivotally mounted in the lengthwise medial axial plane of said tow bar and mast and located respectively at the foot and head of said mast;

manually powered winch means mounted on said tow bar forwardly of said carriage means;

a cable wound up on and paid out from said winch means and being guided by said pulleys to and over said mast head and downwardly therefrom behind said mast;

a transversely symmetrically disposed longitudinally flexible, rectangular vehicle embracing and hoisting hammock;

means for centrally connecting the rear end of said cable to the front end of said hammock;

chain and hook means for temporarily connecting rear lower corners of said hammock to the understructure at one end of the vehicle to be towed guide means fixed on and extending fowardly from a middle portion of the front end of said hammock and straddling said mast to center the upward movement of said hammock on said mast; and means for securing said guide means to said mast when said vehicle has been hoisted to the proper level for towing the same, said securing means allowing a suitable degree of rotation of said guide means about said mast to facilitate steering said trailer in towing said vehicle; and wherein the structure of said hoisting hammock includes a rigid transverse horizontal vehicle hoisting and towing channel iron bar from which the front end of the hammock depends;

and wherein said means for centrally connecting the rear end of said cable to the front end of said hammock comprises a massive steel bar loop welded centrally to and extending upwardly from said channel iron bar to penetrate and be suspended from a cable bight formed by clamps; and wherein said guide means comprises a pair of flange plates massively welded to said channel iron bar and straddling said mast, said plates having aligned transverse holes matching with a pair of horizontal slots provided at said level in said mast; and wherein said guide securing means includes a massive bolt threaded to receive a nut after said bolt is extended through said aligned holes and slots.

3. A combination as recited in claim 2 wherein said hammock includes:

a pair of heavy elastic belting sections clamped at their upper edges to said channel iron bar;

a rigid lower rearward hammock frame member, coextensive with said channel iron bar and to which lower rear edges of said belting sections are clamped; and chain link-locking plates welded to opposite ends of said lower member for adjustably attaching said chains to the lower corners of said hammock.

4. A combination as recited in claim 3 including a rearwardly downwardly inclining skid which is secured to said tow bar and mast to limit the backward rocking of the trailer about the axis of said wheels and to engage said guide flanges to centralize the hammock while it is being used in hoisting a vehicle.

* * * * *